US011967445B2

(12) United States Patent
Tsuchida et al.

(10) Patent No.: US 11,967,445 B2
(45) Date of Patent: Apr. 23, 2024

(54) NTC THERMISTOR ELEMENT

(71) Applicant: TDK CORPORATION, Tokyo (JP)

(72) Inventors: Daisuke Tsuchida, Tokyo (JP); Takehiko Abe, Tokyo (JP); Yoshihiko Satoh, Tokyo (JP); Shingo Yasuda, Tokyo (JP); Yuki Ikeda, Tokyo (JP); Makikazu Takehana, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/636,217

(22) PCT Filed: Nov. 27, 2020

(86) PCT No.: PCT/JP2020/044330
§ 371 (c)(1),
(2) Date: Feb. 17, 2022

(87) PCT Pub. No.: WO2021/112017
PCT Pub. Date: Jun. 10, 2021

(65) Prior Publication Data
US 2022/0301749 A1 Sep. 22, 2022

(30) Foreign Application Priority Data
Dec. 6, 2019 (JP) ................................ 2019-221270

(51) Int. Cl.
*H01C 7/04* (2006.01)
*H01C 1/14* (2006.01)
*H01C 1/148* (2006.01)

(52) U.S. Cl.
CPC ........... *H01C 7/042* (2013.01); *H01C 1/1413* (2013.01); *H01C 1/148* (2013.01)

(58) Field of Classification Search
CPC ....... H01C 7/042; H01C 1/1413; H01C 1/148
See application file for complete search history.

(56) References Cited

U.S. PATENT DOCUMENTS 8,258,915 B2 * 9/2012 Koto ...................... H01C 7/043 338/20
8,947,193 B2 * 2/2015 Rinner ................. H01C 1/1413 338/22 R
(Continued)

FOREIGN PATENT DOCUMENTS

CN 104428847 A 3/2015
CN 105788786 A 7/2016
(Continued)

OTHER PUBLICATIONS

WO-2014139696, machine translation. (Year: 2014).*
(Continued)

*Primary Examiner* — Kyung S Lee
(74) *Attorney, Agent, or Firm* — Oliff PLC

(57) ABSTRACT

An NTC thermistor element includes a thermistor body and a plurality of internal electrodes disposed in the thermistor body and opposing each other. The thermistor body includes a region interposed between adjacent internal electrodes of the plurality of internal electrodes. The region of the thermistor body includes a plurality of crystal grains arranged in succession between the internal electrodes adjacent to each other. The plurality of crystal grains include a first crystal grain, a second crystal grain, and a third crystal grain. The first crystal grain is in contact with one internal electrode of the internal electrodes adjacent to each other. The second crystal grain is in contact with another internal electrode of the internal electrodes adjacent to each other. The third crystal grain is not in contact with the first crystal grain and the second crystal grain.

5 Claims, 10 Drawing Sheets

(56) References Cited

U.S. PATENT DOCUMENTS

| | | | | |
|---|---|---|---|---|
| 2015/0091690 | A1 | 4/2015 | Aoto et al. | |
| 2015/0194244 | A1* | 7/2015 | Hirata | H01C 7/021 29/612 |
| 2017/0213623 | A1 | 7/2017 | Rinner et al. | |

FOREIGN PATENT DOCUMENTS

| | | | | | |
|---|---|---|---|---|---|
| JP | 2004104093 | A | * | 4/2004 | H01C 17/06533 |
| JP | 2011-091199 | A | | 5/2011 | |
| JP | 2012-64696 | A | | 3/2012 | |
| JP | 2015-133359 | A | | 7/2015 | |
| JP | 2016-131195 | A | | 7/2016 | |
| JP | 2017-520116 | A | | 7/2017 | |
| JP | 6428797 | B2 | | 11/2018 | |
| WO | WO-2014139696 | A1 | * | 9/2014 | H01C 1/146 |
| WO | WO-2020008731 | A1 | * | 1/2020 | C01G 45/12 |

OTHER PUBLICATIONS

WO-2020008731, machine translation. (Year: 2020).*
JP2004104093, machine translation. (Year: 2004).*
Jan. 12, 2021 International Search Report issued in International Patent Application No. PCT/JP2020/044330.
May 17, 2022 International Preliminary Report on Patentability issued in International Patent Application No. PCT/JP2020/044330.

* cited by examiner (a)

(b)

NTC THERMISTOR ELEMENT

TECHNICAL FIELD

The present invention relates to an NTC (Negative Temperature Coefficient) thermistor element.

BACKGROUND ART

Known NTC thermistor element include a thermistor body and a plurality of internal electrodes disposed in the thermistor body and opposing each other (refer to, for example, Patent Literature 1). The thermistor body includes a region interposed between adjacent internal electrodes of the plurality of internal electrodes.

CITATION LIST

Patent Literature

Patent Literature 1: Japanese Patent No. 6428797

SUMMARY OF INVENTION

Technical Problem

One aspect of the present invention is to provide an NTC thermistor element capable of reducing a variation in resistance value and improving strength.

Solution to Problem

The present inventors conducted investigation and research on an NTC thermistor element that reduces a variation in resistance value. As a result, the present inventors have newly obtained the following findings and have accomplished the present invention.

The present inventors focused on the above-mentioned region of the thermistor body. This region includes a plurality of crystal grains arranged in succession between internal electrodes adjacent to each other. The plurality of crystal grains include at least a first crystal grain that is in contact with one internal electrode of the internal electrodes adjacent to each other and a second crystal grain that is in contact with another internal electrode of the internal electrodes adjacent to each other. In a configuration in which the plurality of crystal grains include a crystal grain that is not in contact with the first crystal grain and the second crystal grain, diameters of the crystal grains is small, as compared with a configuration in which the plurality of crystal grains include no crystal grain that is not in contact with the first crystal grain and the second crystal grain. In the above-described two configurations, distances (interlayer distances) between the internal electrodes adjacent to each other are equal. The crystal grain having a large diameter tends to have a biased composition within the crystal grain, as compared with the crystal grain having a small diameter. Therefore, the configuration in which the diameter of the plurality of crystal grains is large tends to increase the variation in the resistance value, as compared with the configuration in which the diameter of the plurality of crystal grains is small. That is, the configuration in which the diameter of the plurality of crystal grains is small tends to reduce the variation in the resistance value, as compared with the configuration in which the diameter of the plurality of crystal grains is large.

In the configuration in which the plurality of crystal grains include the crystal grain that is not in contact with the first crystal grain and the second crystal grain, the number of the crystal grains is large, as compared with the configuration in which the plurality of crystal grains do not include the crystal grain that is not in contact with the first crystal grain and the second crystal grain. In the configuration in which the number of crystal grains is large, a large number of crystal grain boundaries exist, as compared with the configuration in which the number of the crystal grains is small. Therefore, the configuration in which the plurality of crystal grains include the crystal grain that is not in contact with the first crystal grain and the second crystal grain improves strength of the thermistor body.

One aspect includes a thermistor body and a plurality of internal electrodes located in the thermistor body and opposing each other. The thermistor body includes a region interposed between adjacent internal electrodes of the plurality of internal electrodes. The region of the thermistor body includes a plurality of crystal grains arranged in succession between the internal electrodes adjacent to each other. The plurality of crystal grains include a first crystal grain in contact with one internal electrode of the internal electrodes adjacent to each other, a second crystal grain in contact with another internal electrode of the internal electrodes adjacent to each other, and a third crystal grain not in contact with the first crystal grain and the second crystal grain.

In the one aspect, the plurality of crystal grains include the third crystal grain that is not in contact with the first crystal grain and the second crystal grain. Therefore, the one aspect can reduce a variation in resistance value and improve strength.

In the one aspect, the NTC thermistor element may be of 0201 size.

In the NTC thermistor element being of 0201 size, a volume of the thermistor body is small, as compared with the NTC thermistor element being of more than or equal to 0402 size. Therefore, the NTC thermistor element being of 0201 size is excellent in thermal responsiveness.

In the one aspect, an average particle diameter of the plurality of crystal grains may be 2 μm or less in a cross section along a direction in which the internal electrodes adjacent to each other oppose each other.

The configuration in which the average particle diameter of the plurality of crystal grains is 2 μm or less in the cross section facilitates densification of the thermistor body in the above-mentioned region. Therefore, this configuration can further reduce the variation in the resistance value and further improve the strength.

In the one aspect, the region of the thermistor element may include crystal grain boundaries in which Zr exists.

The configuration in which the region of the thermistor body include the crystal grain boundaries in which Zr exists tends not to change characteristics over time. Therefore, this configuration realizes an NTC thermistor element that improves reliability.

The one aspect may include a first external electrode disposed at one end of the thermistor body and a second external electrode disposed at the other end of the thermistor body. The plurality of internal electrodes may include a first internal electrode, a second internal electrode, and a third internal electrode. In this case, the first internal electrode is connected to the first external electrode. The second internal electrode is separated from the first internal electrode in a first direction in which the first external electrode and the second external electrode oppose each other with the thermistor body interposed therebetween and is connected to the second external electrode. The third internal electrode opposes the first internal electrode and the second internal electrode and is not connected to the first external electrode and the second external electrode.

Advantageous Effects of Invention

One aspect of the present invention provides an NTC thermistor element capable of reducing a variation in resistance value and improving strength.

DESCRIPTION OF EMBODIMENTS

Figure 1:
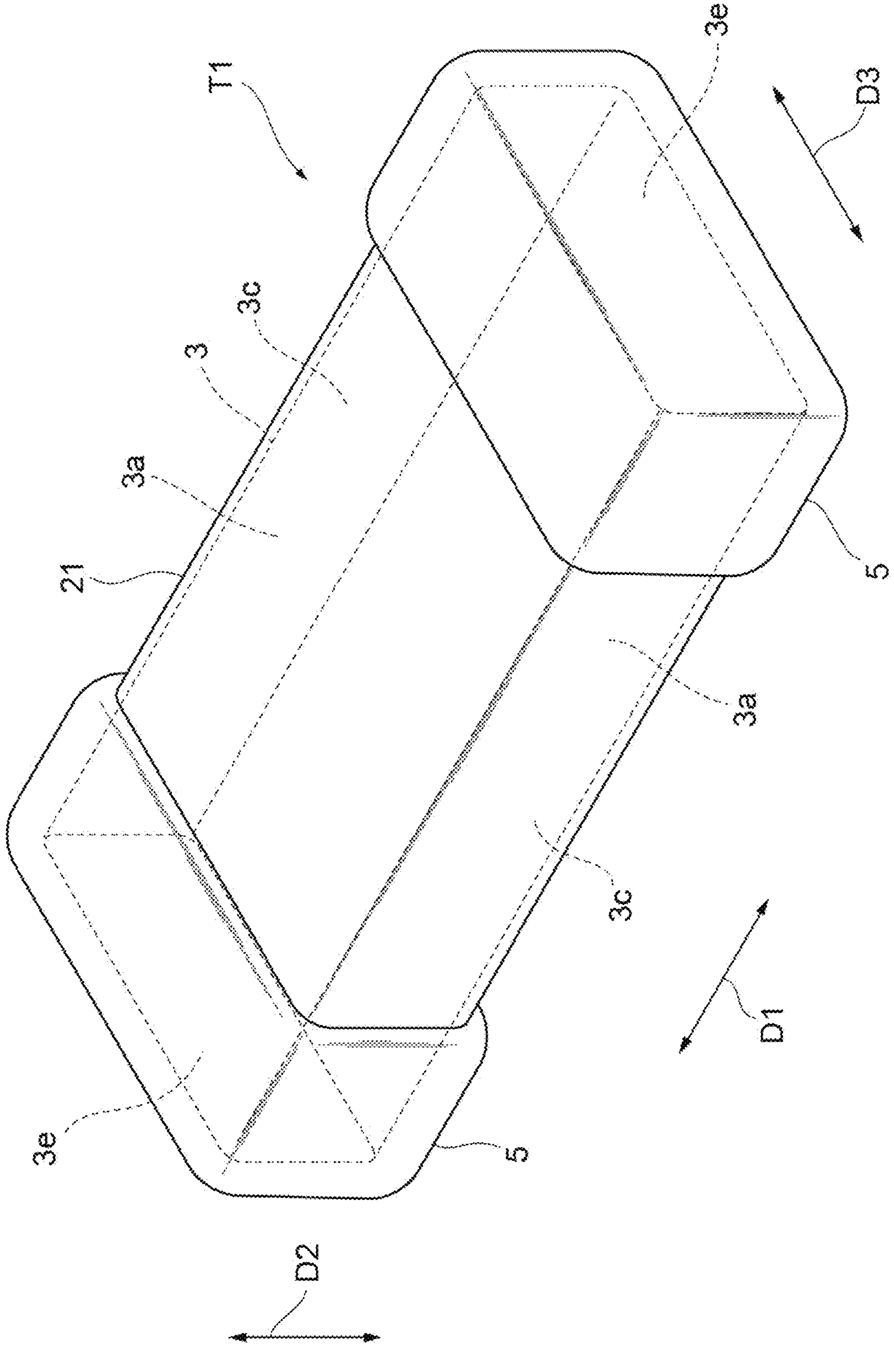
FIG. 1 is a perspective view illustrating an NTC thermistor element according to an embodiment.

Hereinafter, embodiments of the present invention will be described in detail with reference to the accompanying drawings. In the following description, the same elements or elements having the same functions will be denoted with the same reference numerals and overlapped explanation will be omitted.

Figure 2:
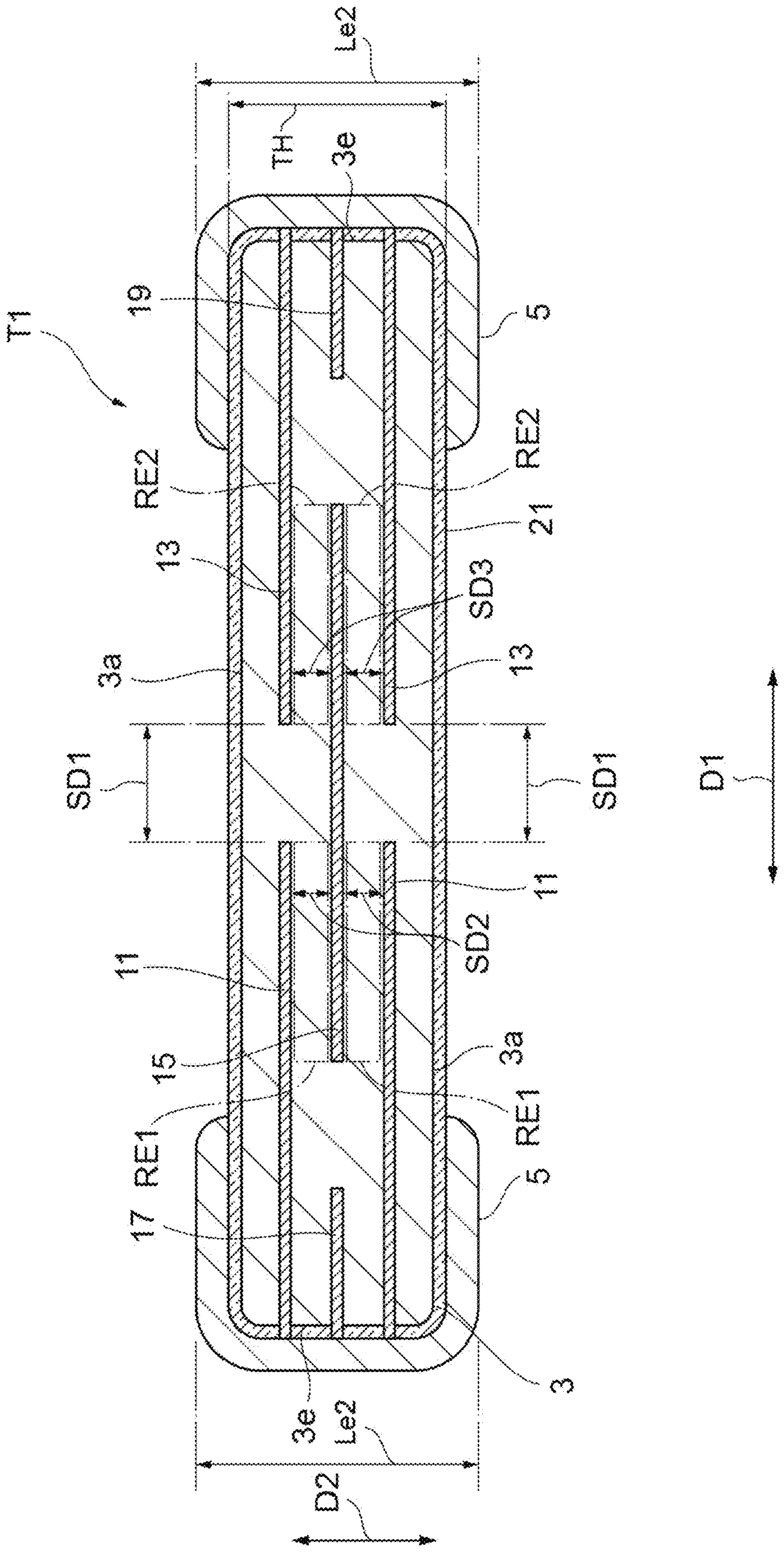
FIG. 2 is a diagram illustrating a cross-sectional configuration of the NTC thermistor element according to the present embodiment.
Figure 3:
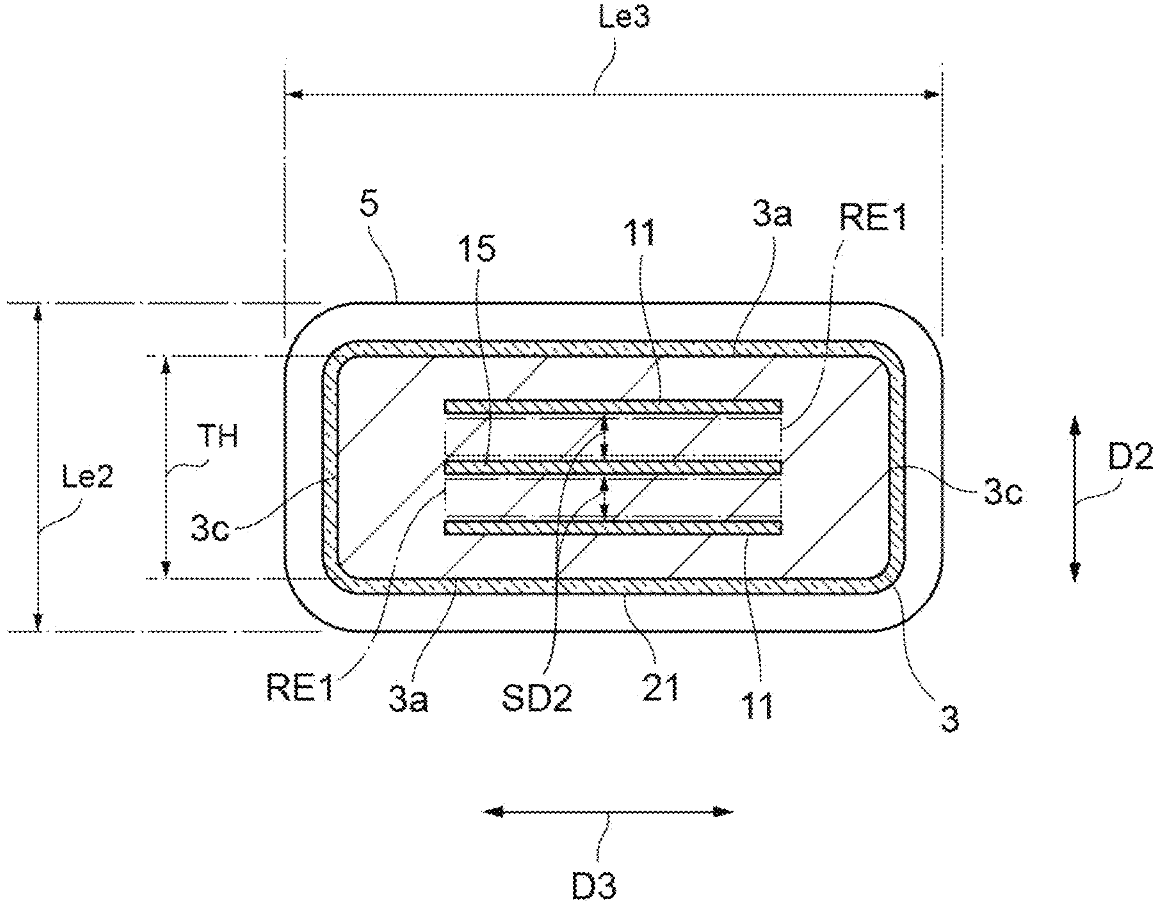
FIG. 3 is a diagram illustrating a cross-sectional configuration of the NTC thermistor element according to the present embodiment.
Figure 4:
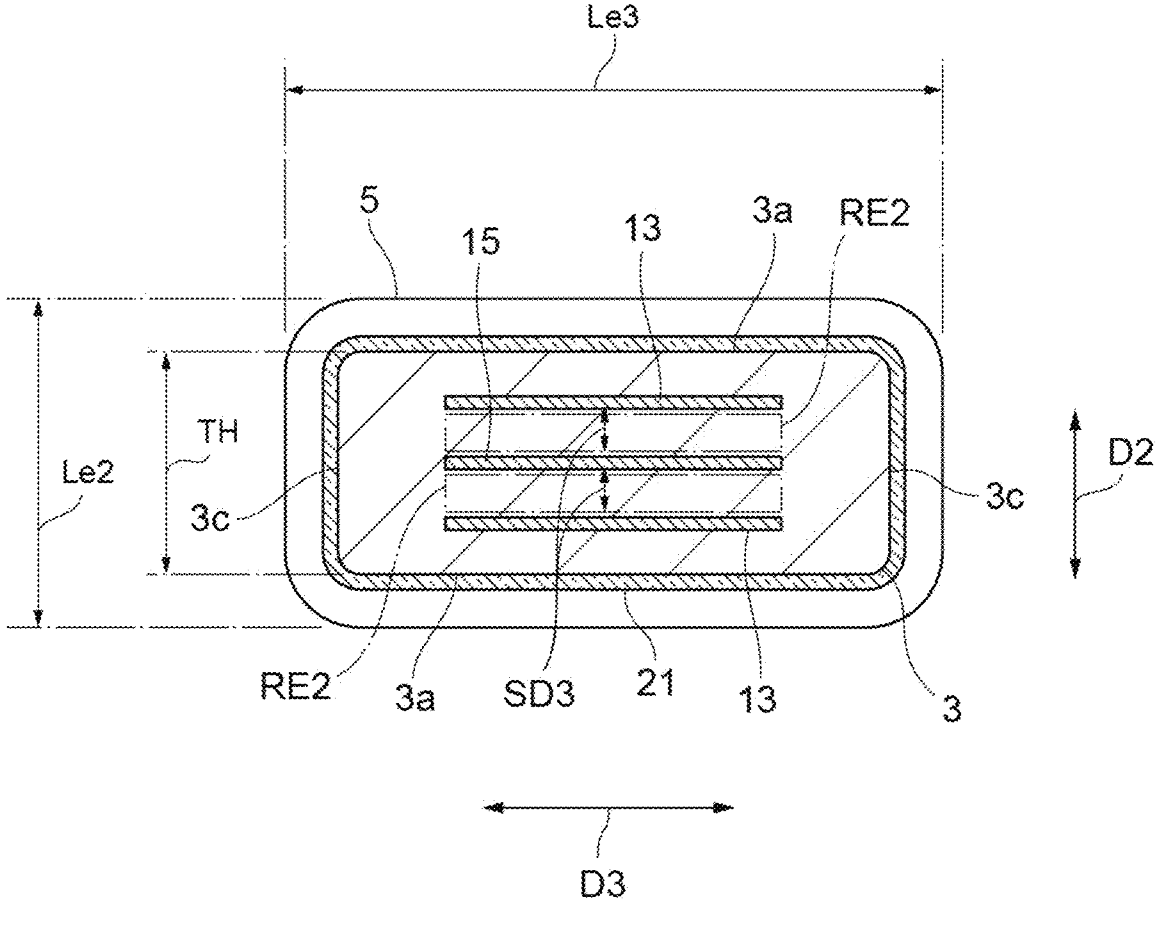
FIG. 4 is a diagram illustrating a cross-sectional configuration of the NTC thermistor element according to the present embodiment.
Figure 5:
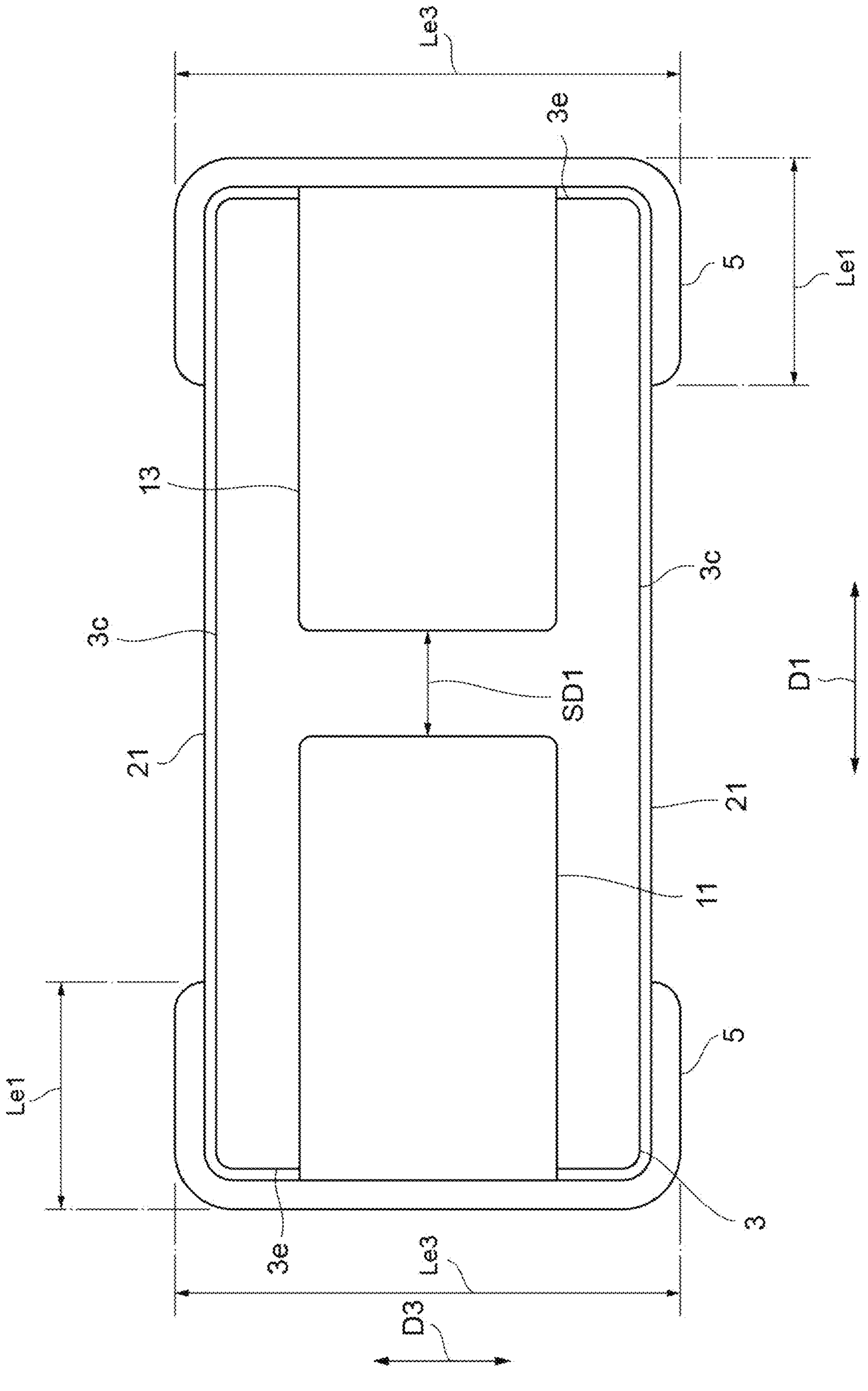
FIG. 5 is a diagram illustrating internal electrodes.
Figure 6:
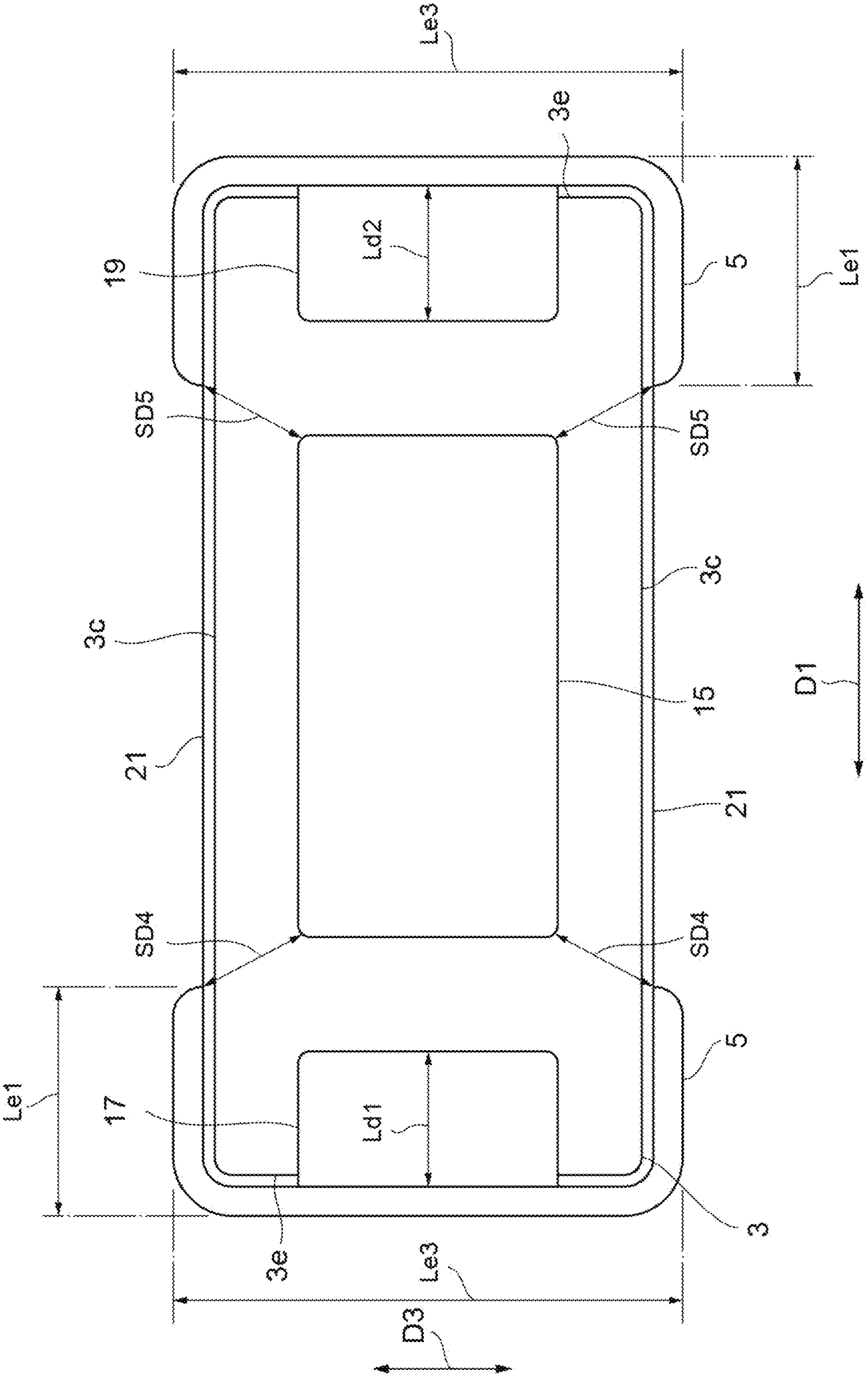
FIG. 6 is a diagram illustrating internal electrodes and dummy electrodes.

A configuration of an NTC thermistor element T1 according to the present embodiment will be described with reference to FIGS. 1 to 6. FIG. 1 is a perspective view illustrating an NTC thermistor element according to the present embodiment. FIG. 2, FIG. 3 and FIG. 4 are diagrams illustrating a cross-sectional configuration of the NTC thermistor element according to the present embodiment. FIG. 5 is a diagram illustrating internal electrodes. FIG. 6 is a diagram illustrating internal electrodes and dummy electrodes.

As illustrated in FIG. 1, the NTC thermistor element T1 includes a thermistor body 3 of a rectangular parallelepiped shape and a plurality of external electrodes 5. In the present embodiment, the NTC thermistor element T1 includes a pair of external electrodes 5. The pair of external electrodes 5 are disposed on an outer surface of the thermistor body 3. The pair of external electrodes 5 are separated from each other. The rectangular parallelepiped shape includes a rectangular parallelepiped shape in which corners and ridges are chamfered or a rectangular parallelepiped shape in which corners and ridges are rounded.

The thermistor body 3 includes a pair of main surfaces 3*a* opposing each other, a pair of side surfaces 3*c* opposing each other, and a pair of end surfaces 3*e* opposing each other. The pair of main surfaces 3*a*, the pair of side surfaces 3*c*, and the pair of end surfaces 3*e* have respective rectangular shapes. The direction in which the pair of end surfaces 3*e* oppose each other is a first direction D1. The direction in which the pair of main surfaces 3*a* oppose each other is a second direction D2. The direction in which the pair of side surfaces 3*c* oppose each other is a third direction D3. The NTC thermistor element T1 is solder-mounted on an electronic device, for example. The electronic device includes, for example, a circuit board or an electronic component. In the NTC thermistor element T1, one of the main surfaces 3*a* opposes the electronic device. The one of the main surfaces 3*a* is arranged to constitute a mounting surface. The one of the main surfaces 3*a* is a mounting surface. Another main surface 3*a* may be arranged to constitute a mounting surface.

The first direction D1 is a direction orthogonal to each end surface 3*e* and is orthogonal to the second direction D2. The second direction D2 is a direction orthogonal to each main surface 3*a*, and the third direction D3 is a direction orthogonal to each side surface 3*c*. The third direction D3 is a direction parallel to each main surface 3*a* and each end surface 3*e*, and is orthogonal to the first direction D1 and the second direction D2. The pair of side surfaces 3*c* extend in the second direction D2 to couple the pair of main surfaces 3*a*. The pair of side surfaces 3*c* also extend in the first direction D1. The pair of end surfaces 3*e* extend in the second direction D2 to couple the pair of main faces 3*a*. The pair of end surfaces 3*e* also extend in the third direction D3.

A length of the thermistor body 3 in the first direction D1 is a length of the thermistor body 3. A length of the thermistor body 3 in the second direction D2 is a thickness TH of the thermistor body 3. A length of the thermistor body 3 in the third direction D3 is a width of the thermistor body 3. The length of the thermistor body 3 is less than 0.4 mm. The width of the thermistor body 3 is less than 0.2 mm. The thickness TH of the thermistor body 3 is less than 0.2 mm.

In the present embodiment, the length of the thermistor body 3 is, for example, 0.225 mm, and the length of the NTC thermistor element T1 in the first direction D1 is, for example, 0.240 mm. The width of the thermistor body 3 is, for example, 0.1 mm, and the length of the NTC thermistor element T1 in the third direction D3 is, for example, 0.115 mm. The NTC thermistor element T1 is of 0201 size in JIS notation. The NTC thermistor element T1 is of 008004 size in EIA notation. In the present embodiment, the thickness TH of the thermistor body 3 is, for example, 0.0446 mm, and the length of the NTC thermistor element T1 in the second direction D2 is, for example, 0.0596 mm That is, the NTC thermistor element T1 has a low profile.

The thermistor body 3 is configured through laminating a plurality of thermistor layers in the second direction D2. The thermistor body 3 includes the plurality of laminated thermistor layers. In the thermistor body 3, a lamination direction of the plurality of thermistor layers coincides with the second direction D2. Each thermistor layer is configured with, for example, a sintered body of a ceramic green sheet including an NTC thermistor material that functions as an NTC thermistor. The NTC thermistor material is, for example, a semiconductor ceramic material. The NTC thermistor material contains, for example, a composite oxide having a spinel structure as a principal component. The composite oxide includes two or more elements selected from transition metal elements such as Mn, Ni, Co, and Fe. The NTC thermistor material may include an accessory component, for example, to improve characteristics. The accessory component includes, for example, Cu, Al, or Zr. In the present embodiment, the accessory component includes at least Zr. The composition and content of the principal component and the accessory component are appropriately determined in accordance with characteristics required for the NTC thermistor element T1. In an actual thermistor body 3, each thermistor layer is integrated to the extent that boundaries between the thermistor layers cannot be visually recognized.

As illustrated in FIG. 1, the external electrodes 5 are disposed on both ends of the thermistor body 3 in the first direction D1. One of the external electrodes 5 is disposed on one end of the thermistor body 3. Another external electrode 5 is disposed on another end of the thermistor body 3. Each external electrode 5 is disposed on the corresponding end surface 3*e* side of the thermistor body 3. The external electrode 5 is disposed on at least the end surface 3*e* and the one of the main surfaces 3*a*. In the present embodiment, each external electrode 5 is disposed on the pair of main surfaces 3*a*, the pair of side surfaces 3*c*, and the end surface 3*e*. The external electrodes 5 are formed on five surfaces that include the pair of main surfaces 3*a*, the end surface 3*e*, and the pair of side surfaces 3*c*. As illustrated in FIGS. 2 to 4, the external electrode 5 includes a portion located on each main surface 3*a*, a portion located on each side surface 3*c*, and a portion located on the end surface 3*e*. For example, when the one of the external electrodes 5 constitutes a first external electrode, the other external electrode 5 constitutes a second external electrode. The pair of external electrodes 5 oppose each other in the first direction D1 with the thermistor body 3 interposed therebetween. The pair of external electrodes 5 are separated from each other in the first direction D1.

The external electrode 5 includes a sintered metal layer. Each portion of the external electrode 5 includes the sintered metal layer. The sintered metal layer is formed from sintering an electrically conductive paste applied onto the surface of the thermistor body 3. The sintered metal layer is formed from sintering a metal component (metal powder) included in the electrically conductive paste. The sintered metal layer is made of a noble metal or a noble metal alloy. The noble metal includes, for example, Ag, Pd, Au, or Pt. The noble metal alloy includes, for example, an Ag—Pd alloy. The sintered metal layer may be made of a base metal or a base metal alloy. The base metal includes, for example, Cu or Ni. The electrically conductive paste includes, for example, the metal powders described above, a glass component, an organic binder, and an organic solvent.

The external electrode 5 may include a plating layer. The plating layer is formed on the sintered metal layer to cover the sintered metal layer. The plating layer may have a two-layer structure. A first layer includes, for example, an Ni plating layer, an Sn plating layer, a Cu plating layer, or an Au plating layer. A second layer formed on the first layer includes, for example, an Sn plating layer, an Sn—Ag alloy plating layer, an Sn—Bi alloy plating layer, or an Sn—Cu alloy plating layer. The plating layer may have a layer structure of three or more layers.

A length Le1 of each external electrode 5 in the first direction D1 is, for example, 50 to 90 μm. A length Le2 of each external electrode 5 in the second direction D2 is, for example, 50 to 140 μm. A length Le3 of each external electrode 5 in the third direction D3 is, for example, 110 to 140 μm. In the present embodiment, the length Le1 is 50 μm, the length Le2 is 59.6 μm, and the length Le3 is 115 μm. In the present embodiment, the length Le1 of each external electrode 5 is equal, the length Le2 of each external electrode 5 is equal, and the length Le3 of each external electrode 5 is equal.

The NTC thermistor element T1 includes a plurality of internal electrodes, as also illustrated in FIGS. 5 and 6. The plurality of internal electrodes are disposed in the thermistor body 3. The plurality of internal electrodes include a plurality of internal electrodes 11, 13, and 15. In the present embodiment, the plurality of internal electrodes include two internal electrodes 11, two internal electrodes 13, and single internal electrode 15. The NTC thermistor element T1 includes a plurality of dummy electrodes 17 and 19. In the present embodiment, single dummy electrode 17 and single dummy electrode 19 are included. For example, when the internal electrode 11 constitutes a first internal electrode, the internal electrode 13 constitutes a second internal electrode and the internal electrode 15 constitutes a third internal electrode.

The plurality of internal electrodes 11, 13, and 15 and the plurality of dummy electrodes 17 and 19 are made of a noble metal or a noble metal alloy, similarly to the external electrode 5. The noble metal includes, for example, Ag, Pd, Au, or Pt. The noble metal alloy includes, for example, an Ag—Pd alloy. The plurality of internal electrodes 11, 13, and 15 and the plurality of dummy electrodes 17 and 19 may be made of a base metal or a base metal alloy. The base metal includes, for example, Cu or Ni. The internal electrodes 11, 13, and 15 and the dummy electrodes 17 and 19 are internal conductors disposed in the thermistor body 3. Each of the internal electrodes 11, 13, and 15 and each of the dummy electrodes 17 and 19 are made of electrically conductive material. The plurality of internal electrodes 11, 13, and 15 and the plurality of dummy electrodes 17 and 19 are configured as a sintered body of an electrically conductive paste containing the electrically conductive material described above.

The internal electrode 11 has a rectangular shape when viewed from the second direction D2. A length of the internal electrode 11 in the first direction D1 is less than half the length of the thermistor body 3. A length of the internal electrode 11 in the third direction D3 is smaller than the width of the thermistor body 3. In this specification, the "rectangular shape" includes, for example, a shape in which each corner is chamfered or a shape in which each corner is rounded. The length of the internal electrode 11 in the first direction D1 is, for example, 90 to 110 μm. The length of the internal electrode 11 in the third direction D3 is, for example, 45 to 75 μm. A thickness of the internal electrode 11 is, for example, 0.5 to 3.0 μm. In the present embodiment, the length of the internal electrode 11 in the first direction D1 is 100 μm, the length of the internal electrode 11 in the third direction D3 is 60 μm, and the thickness of the internal electrode 11 is 2.0 μm.

The two internal electrodes 11 are disposed in different positions (layers) in the second direction D2. Each of the internal electrodes 11 includes one end exposed to one of the end surfaces 3*e*. The portion included in the one of the external electrodes 5 and located on the end surface 3*e* covers the one end of each internal electrode 11. Each of the internal electrodes 11 is directly connected to the one of the external electrodes 5 at the one end exposed to the one of end surfaces 3*e*. Each of the internal electrodes 11 is electrically connected to the one of the external electrodes 5.

The internal electrode 13 has a rectangular shape when viewed from the second direction D2. A length of the internal electrode 13 in the first direction D1 is less than half the length of the thermistor body 3. A length of the internal electrode 13 in the third direction D3 is smaller than the width of the thermistor body 3. The length of the internal electrode 13 in the first direction D1 is, for example, 90 to 110 μm. The length of the internal electrode 13 in the third direction D3 is, for example, 45 to 75 μm. A thickness of the internal electrode 13 is, for example, 0.5 to 3.0 μm. In the present embodiment, the length of the internal electrode 13 in the first direction D1 is 100 μm, the length of the internal electrode 13 in the third direction D3 is 60 μm, and the thickness of the internal electrode 13 is 2.0 μm. In the present embodiment, the shape of the internal electrode 11 and the shape of the internal electrode 13 are equal. In this specification, the term "equal" does not necessarily mean only that values are matched. Even in the case where a slight difference in a predetermined range, a manufacturing error, or a measurement error is included, it can be defined that shapes or values are equal to each other.

The two internal electrodes 13 are disposed in different positions (layers) in the second direction D2. Each of the internal electrodes 13 includes one end exposed to another end surface 3*e*. The portion included in the other external electrode 5 and located on the end surface 3*e* covers the one end of each internal electrode 13. Each of the internal electrodes 13 is directly connected to the other external electrode 5 at the one end exposed to the other end surface 3*e*. Each of the internal electrodes 13 is electrically connected to the other external electrode 5.

Each of the internal electrodes 13 is disposed in the same position (layer) as a corresponding internal electrode 11 of the two internal electrodes 11 in the second direction D2. The internal electrode 11 and the internal electrode 13 are located in the same layer. The internal electrode 11 and the internal electrode 13 are separated from each other in the first direction D1, that is, in the direction in which the pair of external electrodes 5 oppose each other with the thermistor body 3 interposed therebetween. A shortest distance SD1 between the internal electrode 11 and the internal electrode 13 is, for example, 5 to 58 μm. In the present embodiment, the shortest distance SD1 is 25 μm.

The internal electrode 15 has a rectangular shape when viewed from the second direction D2. A length of the internal electrode 15 in the third direction D3 is smaller than the width of the thermistor body 3. A length of the internal electrode 15 in the first direction D1 is, for example, 90 to 168 μm. The length of the internal electrode 15 in the third direction D3 is, for example, 45 to 75 μm. A thickness of the internal electrode 15 is, for example, 0.5 to 3.0 μm. In the present embodiment, the length of the internal electrode 15 in the first direction D1 is 112 μm, the length of the internal electrode 15 in the third direction D3 is 60 μm, and the thickness of the internal electrode 15 is 2.0 μm.

The internal electrodes 15 and the internal electrodes 11 and 13 are disposed in different positions (layers) in the second direction D2. The internal electrode 15 includes no end exposed to the surface of the thermistor body 3. Therefore, the internal electrode 15 is not connected to each of the external electrodes 5. The internal electrode 15 opposes the internal electrodes 11 and 13 in the second direction D2. The internal electrodes 15 and the internal electrodes 11 and 13 are disposed in the thermistor body 3 to oppose each other with an interval in the second direction D2. The internal electrode 15 is located between a layer in which a set of the internal electrodes 11 and 13 corresponding to each other are located and a layer in which another set of the internal electrodes 11 and 13 corresponding to each other are located.

In the present embodiment, a layer in which the internal electrode 15 is located is located in a substantially intermediate portion between the layer in which the set of the internal electrodes 11 and 13 are located and the layer in which the other set of internal electrodes 11 and 13 are located. The internal electrode 15 includes a portion opposing the internal electrode 11, a portion opposing the internal electrode 13, and a portion not opposing the internal electrodes 11 and 13. The portion not opposing the internal electrodes 11 and 13 is located between the portion opposing the internal electrode 11 and the portion opposing the internal electrode 13.

A shortest distance SD2 between the internal electrode 11 and the internal electrode 15 is, for example, 3.0 to 31.3 μm. In the present embodiment, the shortest distance SD2 between one of the internal electrodes 11 and the internal electrode 15 and the shortest distance SD2 between another internal electrode 11 and the internal electrode 15 are equal. In the present embodiment, the shortest distance SD2 is 9.2 μm.

A shortest distance SD3 between the internal electrode 13 and the internal electrode 15 is, for example, 3.0 to 31.3 μm. In the present embodiment, the shortest distance SD3 between one of the internal electrodes 13 and the internal electrode 15 and the shortest distance SD3 between another internal electrode 13 and the internal electrode 15 are equal. In the present embodiment, the shortest distance SD3 is 9.2 μm and is equal to the shortest distance SD2. The shortest distances SD2 and SD3 are also a minimum thickness of the thermistor layer located between the internal electrodes 15 and the internal electrodes 11 and 13. The shortest distances SD2 and SD3 are smaller than the shortest distance SD1. The shortest distances SD2 and SD3 are less than or equal to ¼ the thickness TH of the thermistor body 3.

A shortest distance SD4 between the internal electrode 15 and the one of the external electrodes 5 is, for example, 17.5 to 30.5 μm. In the present embodiment, as illustrated in FIG. 6, the shortest distance SD4 is a shortest distance between a corner of the internal electrode 15 and an end edge of the one of the external electrodes 5. The internal electrode 15 includes one corner near the one of the external electrodes 5 and another corner near the one of the external electrodes 5, and the shortest distance SD4 between the one corner near the one of the external electrodes 5 and the end edge of the one of the external electrodes 5 opposing the one corner and the shortest distance SD4 between the other corner near the one of the external electrodes 5 and the end edge of the one of the external electrodes 5 opposing the other corner are equal. In the present embodiment, the shortest distance SD4 is 24.4 μm.

A shortest distance SD5 between the internal electrode 15 and the other external electrode 5 is, for example, 17.5 to 30.5 μm. In the present embodiment, as illustrated in FIG. 6, the shortest distance SD5 is a shortest distance between a corner of the internal electrode 15 and an end edge of the other external electrode 5. The internal electrode 15 includes one corner near the other external electrodes 5 and another corner near the other external electrodes 5, and the shortest distance SD5 between the one corner near the other external electrodes 5 and the end edge of the other external electrode 5 opposing the one corner and the shortest distance SD5 between the other corner near the other external electrode 5 and the end edge of the other external electrode 5 opposing the other corner are equal. In the present embodiment, the shortest distance SD5 is 24.4 μm and is equal to the shortest distance SD4. The shortest distances SD2 and SD3 are smaller than the shortest distances SD4 and SD5.

The dummy electrode 17 has a rectangular shape when viewed from the second direction D2. A length of the dummy electrode 17 in the third direction D3 is smaller than the width of the thermistor body 3. A length Ld1 of the dummy electrode 17 in the first direction D1 is, for example, 10 to 65 μm. A length of the dummy electrode 17 in the third direction D3 is, for example, 45 to 75 μm. A thickness of the dummy electrode 17 is, for example, 0.5 to 3.0 μm. In the present embodiment, the length Ld1 of the dummy electrode 17 in the first direction D1 is 30 μm, the length of the dummy electrode 17 in the third direction D3 is 60 μm, and the thickness of the dummy electrode 17 is 2.0 μm. The length of the dummy electrode 17 in the third direction D3 is equal to the length of the internal electrode 15 in the third direction D3.

The dummy electrode 17 is disposed in the same position (layer) as the internal electrode 15 in the second direction D2. The dummy electrode 17 and the internal electrode 15 are separated from each other in the first direction D1, that is, in the direction in which the pair of external electrodes 5 oppose each other with the thermistor body 3 interposed therebetween. The dummy electrode 17 and the internal electrode 11 are disposed in the thermistor body 3 to oppose each other with an interval in the second direction D2. The dummy electrode 17 is located between the layer in which the one of the internal electrodes 11 is located and the layer in which the other internal electrode 11 is located. In the present embodiment, a layer in which the dummy electrode 17 is located is located in a substantially intermediate portion between the layer in which the one of the internal electrodes 11 is located and the layer in which the other internal electrode 11 is located. When viewed from the second direction D2, the entire dummy electrode 17 overlaps the internal electrode 11.

The dummy electrode 17 includes one end exposed to the one of the end surfaces 3*e*. The portion included in the one of the external electrodes 5 and located on the end surface 3*e* covers the one end of the dummy electrode 17. The dummy electrode 17 is directly connected to the one of the external electrodes 5 at the one end exposed to the one of the end surfaces 3*e*. The dummy electrode 17 is electrically connected to the one of the external electrodes 5. The length Ld1 of the dummy electrode 17 is smaller than the length Le1 of the external electrode 5 to which the dummy electrode 17 is connected. The length Ld1 of the dummy electrode 17 is larger than the shortest distances SD2 and SD3.

The dummy electrode 19 has a rectangular shape when viewed from the second direction D2. A length of the dummy electrode 19 in the third direction D3 is smaller than the width of the thermistor body 3. The length Ld2 of the dummy electrode 19 in the first direction D1 is, for example, 10 to 65 μm. The length of the dummy electrode 19 in the third direction D3 is, for example, 45 to 75 μm. A thickness of the dummy electrode 19 is, for example, 0.5 to 3.0 μm. In the present embodiment, the length Ld2 of the dummy electrode 19 in the first direction D1 is 30 μm, the length of the dummy electrode 19 in the third direction D3 is 60 μm, and the thickness of the dummy electrode 19 is 2.0 μm. The length of the dummy electrode 19 in the third direction D3 is equal to the length of the internal electrode 15 in the third direction D3. In the present embodiment, the shape of the dummy electrode 17 and the shape of the dummy electrode 19 are equal. The length Ld1 and the length Ld2 are equal.

The dummy electrode 19 is disposed in the same position (layer) as the internal electrode 15 in the second direction D2. The dummy electrode 19 and the internal electrode 15 are separated from each other in the first direction D1, that is, in the direction in which the pair of external electrodes 5 oppose each other with the thermistor body 3 interposed therebetween. The dummy electrode 19 and the internal electrode 13 are disposed in the thermistor body 3 to oppose each other with an interval in the second direction D2. The dummy electrode 19 is located between the layer in which the one of the internal electrodes 13 is located and the layer in which the other internal electrode 13 is located. In the present embodiment, a layer in which the dummy electrode 19 is located is located in a substantially intermediate portion between the layer in which the one of the internal electrodes 13 is located and the layer in which the other internal electrode 13 is located. When viewed from the second direction D2, the entire dummy electrode 19 overlaps the internal electrode 13.

The dummy electrode 19 includes one end exposed to the other end surface 3*e*. The portion included in the other external electrode 5 and located on the end surface 3*e* covers the one end of the dummy electrode 19. The dummy electrode 19 is directly connected to the other external electrode 5 at the one end exposed to the other end surface 3*e*. The dummy electrode 19 is electrically connected to the other external electrode 5. The length Ld2 of the dummy electrode 19 is smaller than the length Le1 of the external electrode 5 to which the dummy electrode 19 is connected. The length Ld2 of the dummy electrode 19 is larger than the shortest distances SD2 and SD3.

The NTC thermistor element T1 includes a coating layer 21 as also illustrated in FIGS. 2 to 4. The coating layer 21 is formed on the surface of the thermistor body 3 (the pair of main surfaces 3*a*, the pair of side surfaces 3*c*, and the pair of end surfaces 3*e*). The coating layer 21 covers the surface of the thermistor body 3. In the present embodiment, substantially the entire surface of the thermistor body 3 is covered. The coating layer 21 is a layer made of a glass material. A thickness of the coating layer 21 is, for example, 0.01 to 0.5 μm. In the present embodiment, the thickness of the coating layer 21 is 0.15 μm. The glass material is, for example, an $SiO_2$—$Al_2O_3$—$LiO_2$-based crystallized glass. The glass material may be an amorphous glass. The internal electrodes 11 and 13 and the dummy electrodes 17 and 19 penetrate the coating layer 21 and are connected to the corresponding external electrodes 5.

Figure 7:
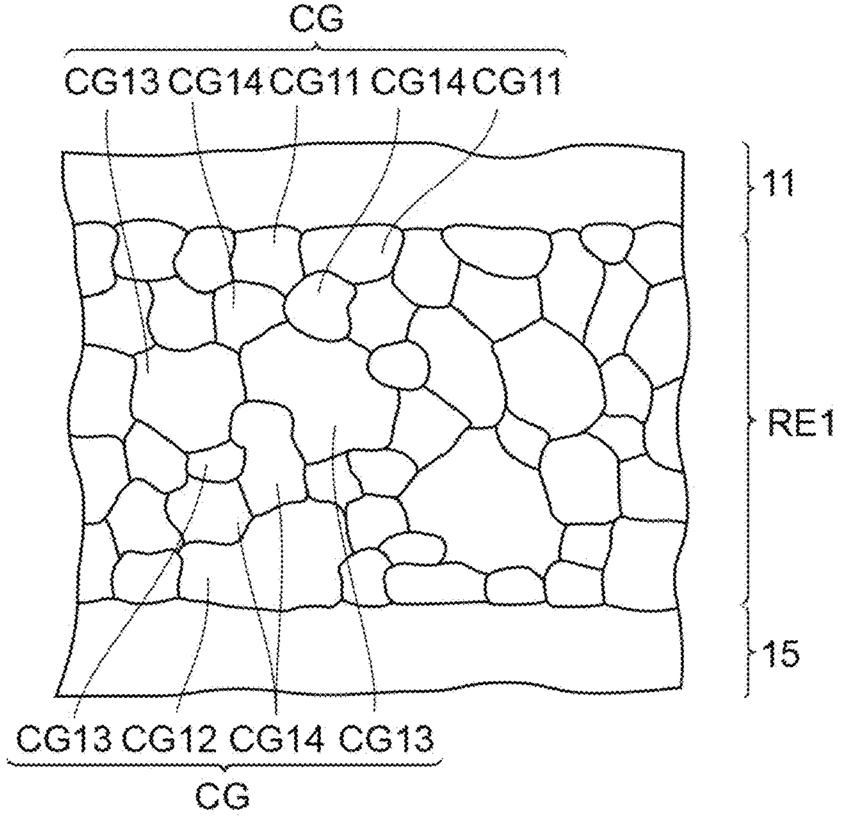
FIG. 7 is a schematic diagram illustrating a configuration of a thermistor body.
Figure 7:
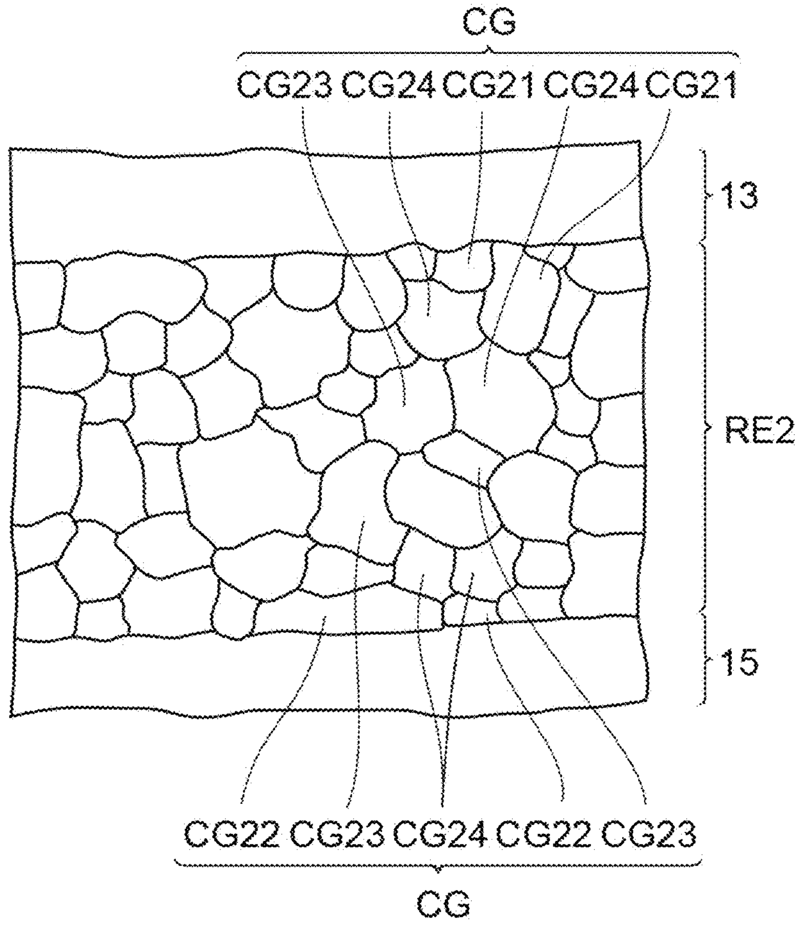

The thermistor body 3 includes a plurality of regions RE1 and RE2 as illustrated in FIGS. 2 to 4. In the present embodiment, the thermistor body 3 includes two regions RE1 and two regions RE2. The region RE1 is interposed between the internal electrodes 11 and the internal electrodes 15 adjacent to each other. The region RE2 is interposed between the internal electrodes 13 and the internal electrodes adjacent to each other. As illustrated in FIG. 7, each of the regions RE1 and RE2 includes a plurality of crystal grains CG. Each of the regions RE1 and RE2 includes crystal grain boundaries in which Zr exists. Zr exists in the crystal grain boundaries, for Zr included in the accessory component of the NTC thermistor material is precipitated in the crystal grain boundaries. FIG. 7 is a schematic diagram illustrating a configuration of the thermistor body.

In the region RE1, as illustrated in FIG. 7(*a*), the plurality of crystal grains CG contain a plurality of crystal grains CG11, CG12, CG13, and CG14 that are arranged in succession between the internal electrode 11 and the internal electrode 15. The state in which the plurality of crystal grains CG11, CG12, CG13, and CG14 are arranged in succession is a state in which the crystal grains adjacent to each other of the plurality of crystal grains CG11, CG12, CG13, and CG14 are in direct contact with each other.

The crystal grain CG11 is in direct contact with the internal electrode 11. The crystal grain CG12 is in direct contact with the internal electrode 15. The crystal grain CG13 is not in direct contact with the internal electrode 11 and the internal electrode 15. The crystal grain CG13 is not in direct contact with the crystal grain CG11 and the crystal grain CG12. At least one crystal grain CG14 is located between the crystal grain CG11 and the crystal grain CG13. At least one crystal grain CG14 is also located between the crystal grain CG12 and the crystal grain CG13. For example, when the crystal grain CG11 constitutes a first crystal grain, the crystal grain CG12 constitutes a second crystal grain and at least the crystal grain CG13 constitutes a third crystal grain.

In the region RE2, as illustrated in FIG. 7(*b*), the plurality of crystal grains CG contain a plurality of crystal grains CG21, CG22, CG23, and CG24 which are arranged in succession between the internal electrode 13 and the internal electrode 15. The plurality of crystal grains CG21, CG22, CG23, and CG24 are arranged in succession in a state in which the crystal grains adjacent to each other of the plurality of crystal grains CG21, CG22, CG23, and CG24 are in direct contact with each other.

The crystal grain CG21 is in direct contact with the internal electrode 13. The crystal grain CG22 is in direct contact with the internal electrode 15. The crystal grain CG23 is not in direct contact with the internal electrode 13 and the internal electrode 15. The crystal grain CG23 is not in direct contact with the crystal grain CG21 and the crystal grain CG22. At least one crystal grain CG24 is located between the crystal grain CG21 and the crystal grain CG23. At least one crystal grain CG24 is also located between the crystal grain CG22 and the crystal grain CG23. For example, when the crystal grain CG21 constitutes a first crystal grain, the crystal grain CG22 constitutes a second crystal grain and at least the crystal grain CG23 constitutes a third crystal grain.

In a cross section along the second direction D2, an average particle diameter of the plurality of crystal grains CG is 2 μm or less. Among the plurality of crystal grains CG, the particle diameter of a largest crystal grain CG is, for example, approximately 5 μm. Among the plurality of crystal grains CG, the particle diameter of a smallest crystal grain CG is, for example, approximately 0.5 μm. In the present embodiment, the average particle diameter of the plurality of crystal grains CG is equal to or less than the thickness of each of the internal electrodes 11, 13, and 15.

The average particle diameter of the plurality of crystal grains CG can be obtained, for example, as follows.

Figure 8:
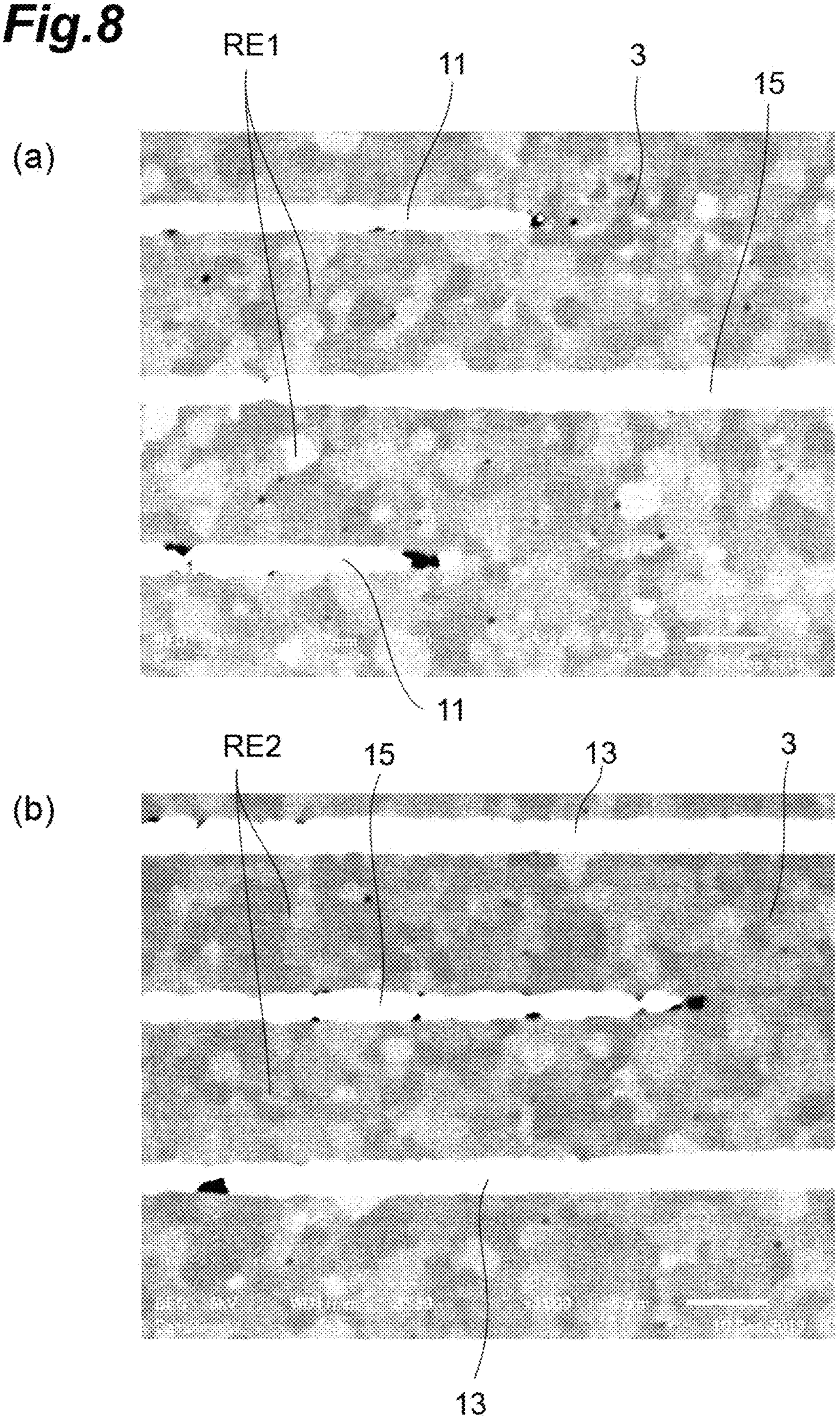
FIG. 8 is a cross-section photograph of the thermistor body.

A cross-section photograph of the thermistor body 3 (NTC thermistor element T1) at a position including the internal electrodes 11, 13, and 15 (regions RE1 and RE2) is acquired (refer to FIG. 8). The cross-section photograph includes a photograph obtained from capturing a cross section of the thermistor body 3 when cut in a plane orthogonal to the main surface 3*a*. The cross-section photograph includes, for example, a photograph obtained from capturing a cross section of the thermistor body 3 when cut in a plane parallel to the pair of side surfaces 3*c* and equidistant from the pair of side surfaces 3*c*. The cross-section photograph may include, for example, a photograph obtained from capturing a cross section of the thermistor body 3 when cut in the plane parallel to the pair of main surfaces 3*a* and located between the internal electrodes 11 and 13. The photograph may include a SEM (scanning electron microscope) photograph. FIG. 8 is a cross-section photograph of the thermistor body.

Image processing is performed on the acquired cross-section photograph using software. From the image processing, a boundary of each crystal grain CG is determined, and an area of the crystal grain CG included in each of the regions RE1 and RE2 is calculated. The particle diameter converted to a circle equivalent diameter is calculated based on the calculated area of the crystal grain CG. The particle diameters of all the crystal grains CG included in each of the regions RE1 and RE2 in the cross-section photograph may be calculated. The particle diameter of an arbitrary number of crystal grains CG among the crystal grains CG included in each region RE1 and RE2 in the cross-section photograph may be calculated. The arbitrary number is, for example, 50. An average value of the obtained particle diameters of the crystal grains CG is defined as the average particle diameter.

In the cross section along the second direction D2, the number of the plurality of crystal grains CG existing in the range of 8 μm square is 14 or more. An average value of the number of the plurality of crystal grains CG existing in the range of 8 μm square is, for example, 18. The maximum number of the plurality of crystal grains CG existing in the range of 8 μm square is, for example, 24.

The number of the plurality of crystal grains CG existing in the range of 8 μm square can be obtained, for example, as follows.

A cross-section photograph of the thermistor body 3 (NTC thermistor element T1) at a position including the internal electrodes 11, 13, and 15 (regions RE1 and RE2) is acquired. The cross-section photograph includes a photograph obtained from capturing a cross section of the thermistor body 3 when cut in a plane orthogonal to the main surface 3*a*. The cross-section photograph includes, for example, a photograph obtained from capturing a cross section of the thermistor body 3 when cut in the plane parallel to the pair of side surfaces 3*c* and equidistant from the pair of side surfaces 3*c*. The cross-section photograph may include the cross-section photograph captured when obtaining the average particle diameter.

Image processing is performed on the acquired cross-section photograph using software. From the image processing, a boundary of each crystal grain CG is determined. The number of crystal grains CG existing in an arbitrary range of 8 μm square on the image in which the boundary of each crystal grain CG is determined is obtained.

Figure 9:
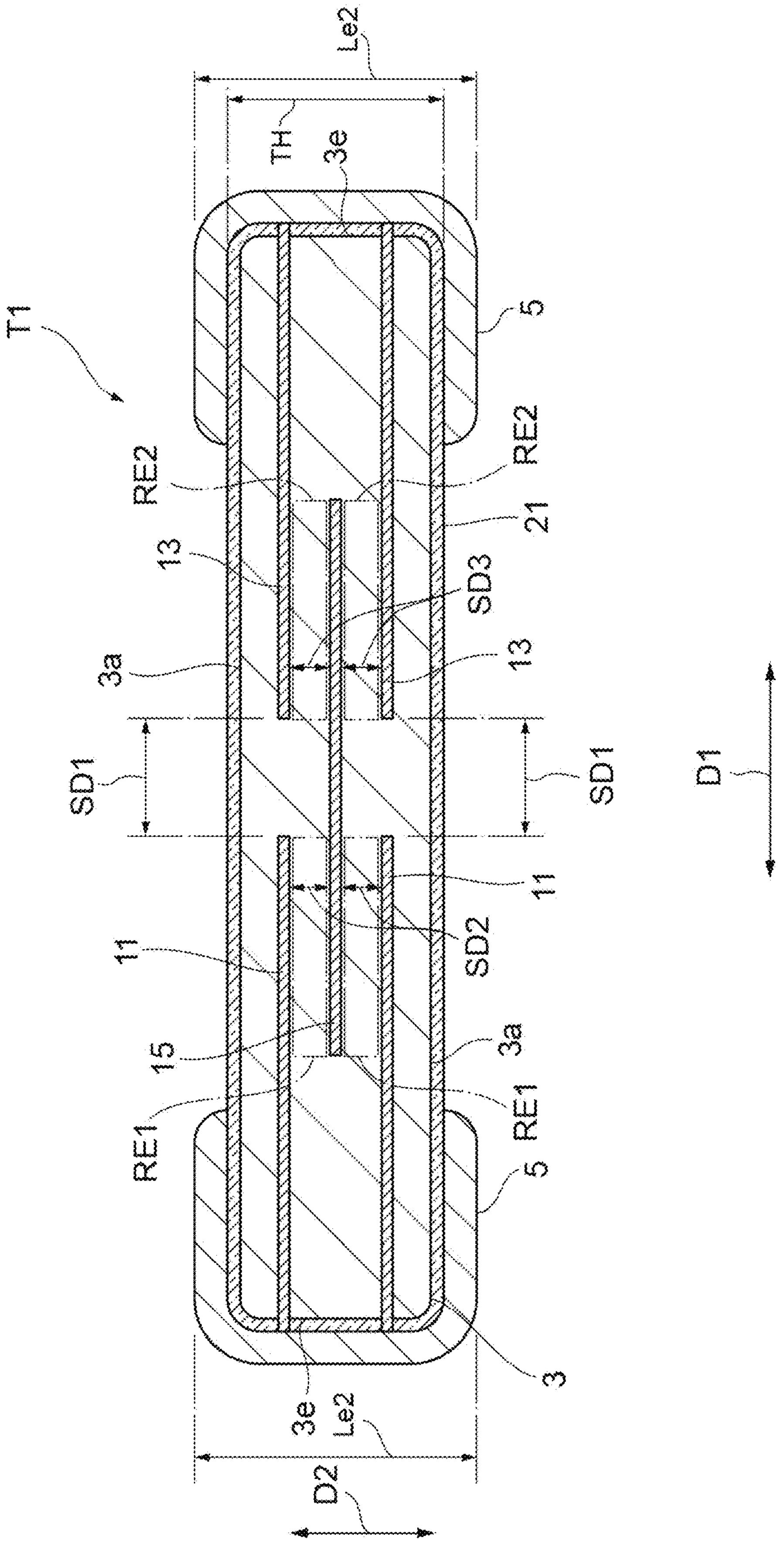
FIG. 9 is a diagram illustrating a relationship between a resistivity p and a zero load resistance value $R_{25}$ at 25° C. of the thermistor body.

As also illustrated in FIG. 9, a resistivity (ρ) of the thermistor body 3 satisfies a relational expression of $$\rho = \alpha \times (S \times n / T) \times R_{25}$$

including a zero load resistance value ($R_{25}$) at 25° C. in the thermistor body 3. "S" included in the above relational expression indicates a total value of an area of a region where the internal electrode 11 and the internal electrode 15 overlap each other in the second direction D2 and an area of a region where the internal electrode 13 and the internal electrode 15 overlap each other in the second direction D2. "n" included in the above relational expression indicates the number of regions located between the internal electrodes 11 and 13 and the internal electrodes 15 in the thermistor body 3, in the second direction D2. "T" included in the above relational expression indicates an interval between the internal electrodes 11 and 13 and the internal electrode 15 in the second direction D2. The interval T may be the shortest distances SD2 and SD3. The interval T may be an average value of the intervals between the internal electrodes 11 and 13 and the internal electrode 15 in the second direction D2 in the region where the internal electrode 11 and the internal electrode 15 overlap in the second direction D2 and the region where the internal electrode 13 and the internal electrode 15 overlap in the second direction D2. "α" included in the above relational expression indicates a coefficient dependent on a resistance value of a portion other than the thermistor body 3. The portion other than the thermistor body 3 includes, for example, the internal electrodes 11, 13, and 15 and the external electrodes 5.

In the present embodiment, the total value (S) is 5220 $\mu m^2$. The number (n) is 2. The interval (T) is 9.2 μm. The coefficient (a) is 40.54. The zero load resistance value ($R_{25}$) is approximately 100000Ω. The resistivity (ρ) of the thermistor body 3 is approximately 4600 Ω·m.

When the resistivity ρ of the thermistor body 3 is relatively small, a variation in overlap areas between the internal electrodes 11 and 13 and the internal electrode 15 has a greater influence on a variation in resistance value than a variation in intervals (interlayer distances) between the internal electrodes 11 and 13 and the internal electrode 15. When the resistivity ρ of the thermistor body 3 is relatively large, the variation in the interlayer distances has a greater influence on the variation in the resistance value than the variation in the overlap areas.

The present inventors established configurations of the internal electrodes 11, 13, and 15, and after that, focused the distance (interlayer distance) between the internal electrode 11 and the internal electrode 15 and the distance (interlayer distance) between the internal electrode 13 and the internal electrode 15. The NTC thermistor element T1 being of less than 0402 size reduces the variation in the resistance value only when the distance between the internal electrode 11 and the internal electrode 15 and the distance between the internal electrode 13 and the internal electrode 15 satisfy the following relationships. That is, unless the distance between the internal electrode 11 and the internal electrode 15 and the distance between the internal electrode 13 and the internal electrode 15 satisfy the following relationship, the NTC thermistor element T1 being of less than 0402 size with the reduced the variation in the resistance value is not realized.

Each of the shortest distances SD2 and SD3 is smaller than the shortest distance SD1. Each of the shortest distances SD2 and SD3 is smaller than each of the shortest distances SD4 and SD5. Each of the shortest distances SD2 and SD3 is less than or equal to ¼ the thickness TH of the thermistor body 3.

As described above, in the present embodiment, the plurality of crystal grains CG include the crystal grains CG13 and CG23.

In the configuration in which the plurality of crystal grains CG include the crystal grains CG13 and CG23, the diameter of the crystal grain CG is small, as compered with in the configuration in which the plurality of crystal grains CG do not contain the crystal grains CG13 and CG23. In the above-described two configurations, the distance (interlayer distance) between the internal electrode 11 and the internal electrode 15 and the distance (interlayer distance) between the internal electrode 13 and the internal electrode 15 are equal. In the configuration in which the region RE1 does not include the crystal grain CG13, the crystal grain other than the crystal grains CG11 and CG12 among the plurality of crystal grains CG is in direct contact with at least one of the crystal grain CG11 and the crystal grain CG12. In the configuration in which the region RE2 does not include the crystal grain CG23, the crystal grain other than the crystal grains CG21 and CG22 among the plurality of crystal grains CG is in direct contact with at least one of the crystal grain CG21 and the crystal grain CG22.

The crystal grain CG having a large diameter tends to have a biased composition within the crystal grain CG, as compared with the crystal grain CG having a small diameter. Therefore, the configuration in which the diameter of the plurality of crystal grains CG is large tends to increase the variation in the resistance value, as compared with the configuration in which the diameter of the plurality of crystal grains CG is small. That is, the configuration in which the diameter of the plurality of crystal grains CG is small tends to reduce the variation in the resistance value as compared with the configuration in which the diameter of the plurality of crystal grains CG is large.

In the configuration in which the plurality of crystal grains CG include the crystal grains CG13 and CG23, the number of crystal grains CG is large, as compared with the configuration in which the plurality of crystal grains CG do not include the crystal grains CG13 and CG23. In the configuration in which the number of crystal grains CG is large, a large number of crystal grain boundaries exist, as compared with the configuration in which the number of crystal grains CG is small. Therefore, the configuration in which the plurality of crystal grains CG include the crystal grains CG13 and CG23 improves strength of the thermistor body 3.

Consequently, the NTC thermistor element T1 can reduce the variation in the resistance value and improve the strength.

The NTC thermistor element T1 is of 0201 size.

A volume of the thermistor body 3 in the NTC thermistor element being of 0201 size is smaller than that in the NTC thermistor element being of more than or equal to 0402 size. Therefore, the NTC thermistor element T1 being of 0201 size is excellent in thermal responsiveness.

In the NTC thermistor element T1, the average particle diameter of the plurality of crystal grains CG is 2 μm or less in the cross section along the second direction D2.

The configuration in which the average particle diameter of the plurality of crystal grains CG is 2 μm or less in the cross section along the second direction D2 facilitates densification of the thermistor body 3 in the regions RE1 and RE2. Therefore, the NTC thermistor element T1 can further reduce the variation in the resistance value and further improve the strength.

In the NTC thermistor element T1, the regions RE1 and RE2 of the thermistor body 3 include the crystal grain boundaries in which Zr exists.

The configuration in which the regions RE1 and RE2 of the thermistor body 3 include the crystal grain boundaries in which Zr exists tends not to change characteristics over time. Therefore, the present embodiment realizes the NTC thermistor element T1 that improves reliability.

In the NTC thermistor element T1, the number of the plurality of crystal grains existing in the range of 8 μm square in the cross section along the second direction D2 is 14 or more.

The configuration in which the number of the plurality of crystal grains existing in the range of 8 μm square is 14 or more in the cross section along the second direction D2 facilitates densification of the thermistor body 3 in the regions RE1 and RE2. Therefore, the NTC thermistor element T1 can further reduce the variation in the resistance value and further improve the strength.

The NTC thermistor element T1 is of less than 0402 size. The NTC thermistor element T1 includes the thermistor body 3, the pair of external electrodes 5, and internal electrodes 11, 13, and 15. The internal electrode 11 and the internal electrode 13 are separated from each other in the first direction D1 in which the pair of external electrodes 5 oppose each other with the thermistor body 3 interposed therebetween. The internal electrode 15 opposes the internal electrodes 11 and 13, and is not connected to each external electrode 5. Each of the shortest distances SD2 and SD3 is smaller than each of the shortest distances SD1, SD4, and SD5 and is less than or equal to ¼ the thickness TH of the thermistor body 3.

Therefore, even when the NTC thermistor element T1 is of less than 0402 size, the NTC thermistor element T1 can further reduce the variation in the resistance value.

The NTC thermistor element T1 includes the coating layer 21. The coating layer 21 covers the surface of the thermistor body 3 and is made of a glass material.

The configuration in which the coating layer 21 made of a glass material covers the surface of the thermistor body 3 ensures electrical insulation of the surface of the thermistor body 3.

In the NTC thermistor element T1, the dummy electrode 17 is separated from the internal electrode 15 in the first direction D1 and is connected to the one of the external electrodes 5. The dummy electrode 19 is separated from the internal electrode 15 in the first direction D1 and is connected to the other external electrode 5.

The NTC thermistor element T1 includes the dummy electrodes 17 and 19. Therefore, the NTC thermistor element T1 controls a variation in distance (interlayer distance) between the internal electrode 11 and the internal electrode 15 and the variation in distance (interlayer distance) between the internal electrode 13 and the internal electrode 15. Consequently, the NTC thermistor element T1 can further reduce the variation in the resistance value.

Each of the lengths Ld1 and Ld2 is smaller than the length Le1 of each external electrode 5 and is larger than each of the shortest distances SD2 and SD3.

Therefore, the NTC thermistor element T1 can further reliably reduces the variation in the resistance value.

When making the NTC thermistor element T1, tip shapes of the internal electrodes 11, 13, and 15 change with the diameters of the plurality of crystal grains CG. When the tips of the internal electrodes 11, 13, and 15 are tapered, the area of the region where the internal electrode 11 and the internal electrode 15 overlap in the second direction D2 and the internal electrode 13 and the area of the region where the internal electrode 15 overlap in the second direction D2 may vary. The variation in the overlap areas between the internal electrodes 11 and 13 and the internal electrode 15 causes the NTC thermistor element T1 to have the variation in the resistance value.

In the configuration in which the diameters of the plurality of crystal grains CG are small, the tips of the internal electrodes 11, 13, and 15 tend not to be tapered, as compared with the configuration in which the diameters of the plurality of crystal grains CG are large. Therefore, the NTC thermistor element T1 can further reduce the variation in the resistance value.

Although the embodiment and modification of the present invention have been described above, the present invention is not necessarily limited to the above-described embodiment and modification, and the embodiment can be variously changed without departing from the spirit of the invention.

Figure 10:
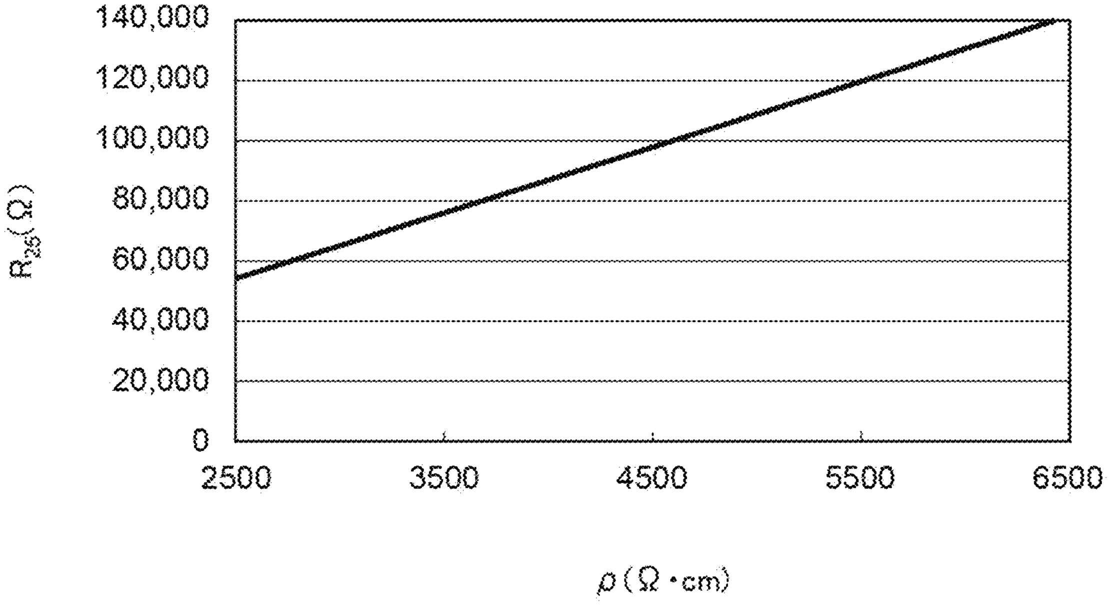
FIG. 10 is a diagram illustrating a cross-sectional configuration of an NTC thermistor element according to a modification of the present embodiment.

As illustrated in FIG. 10, the NTC thermistor element T1 may not include the dummy electrodes 17 and 19. The NTC thermistor element T1 not including the dummy electrodes 17 and 19 also reduces the variation in the resistance value.

Each of the numbers of the internal electrodes 11 and 13 is not limited to two. Each of the numbers of internal electrodes 11 and 13 may be one. Each of the numbers of internal electrodes 11 and 13 may be three or more. In this case, the number of internal electrodes 15 may be two or more.

In the cross section along the second direction D2, the average particle diameter of the plurality of crystal grains CG may be larger than 2 μm. As described above, the NTC thermistor element T1 including the configuration in which the average particle diameter of the plurality of crystal grains CG is 2 μm or less in the cross section along the second direction D2 can further reduce the variation in the resistance value and can further improve the strength.

The regions RE1 and RE2 of the thermistor body 3 may not include crystal grain boundaries in which Zr exists. The configuration in which the regions RE1 and RE2 of the thermistor body 3 include crystal grain boundaries in which Zr exists realizes the NTC thermistor element T1 with improved reliability, as described above.

INDUSTRIAL APPLICABILITY

The present invention may be used for NTC thermistor elements.

REFERENCE SIGNS LIST

3: thermistor body, 5: external electrode, 11, 13, 15: internal electrode, CG, CG11, CG12, CG13, CG14, CG21, CG22, CG23, CG24: crystal grain, D1: first direction, D2: second direction, D3: third direction, RE1, RE2: region of thermistor body, T1: NTC thermistor element.

The invention claimed is:

1. NTC thermistor element comprising:

a thermistor body; and a plurality of internal electrodes disposed in the thermistor body and opposing each other, wherein the thermistor body includes a region interposed between adjacent internal electrodes of the plurality of internal electrodes, wherein the region of the thermistor body includes a plurality of crystal grains arranged in succession between the internal electrodes adjacent to each other, and wherein the plurality of crystal grains include:

a first crystal grain being in contact with one internal electrode of the internal electrodes adjacent to each other, a second crystal grain being in contact with another internal electrode of the internal electrodes adjacent to each other, and a third crystal grain not being in contact with the first crystal grain and the second crystal grain, and wherein the plurality of crystal grains are made of a semiconductor ceramic material.

2. The NTC thermistor element according to claim 1, wherein the NTC thermistor element is of 0201 size.

3. The NTC thermistor element according to claim 1, wherein an average particle diameter of the plurality of crystal grains is 2 μm or less in a cross section along a direction in which the internal electrodes adjacent to each other oppose each other.

4. The NTC thermistor element according to claim 1, wherein the region of the thermistor body includes crystal grain boundaries in which Zr exists.

5. The NTC thermistor element according to claim 1, further comprising:

a first external electrode disposed at one end of the thermistor body; and a second external electrode disposed at another end of the thermistor body, wherein the plurality of internal electrodes include:

a first internal electrode connected to the first external electrode;

a second internal electrode separated from the first internal electrode in a first direction in which the first external electrode and the second external electrode oppose each other with the thermistor body interposed therebetween and connected to the second external electrode; and a third internal electrode opposing the first internal electrode and the second internal electrode and not connected to the first external electrode and the second external electrode.

* * * * *